United States Patent
Ohtomo et al.

(10) Patent No.: US 9,577,286 B2
(45) Date of Patent: Feb. 21, 2017

(54) METHOD OF PRODUCING SOLID STATE LITHIUM BATTERY MODULE

(71) Applicant: TOYOTA JIDOSHA KABUSHIKI KAISHA, Toyota-shi, Aichi (JP)

(72) Inventors: Takamasa Ohtomo, Susono (JP); Yuki Kato, Gotenba (JP); Masatsugu Kawakami, Gotenba (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 178 days.

(21) Appl. No.: 14/619,768

(22) Filed: Feb. 11, 2015

(65) Prior Publication Data

US 2015/0236373 A1    Aug. 20, 2015

(30) Foreign Application Priority Data

Feb. 20, 2014    (JP) .................................. 2014-030658

(51) Int. Cl.

| | | |
|---|---|---|
| *H01M 10/052* | (2010.01) | |
| *H01M 10/0562* | (2010.01) | |
| *C03C 3/32* | (2006.01) | |

(52) U.S. Cl.
CPC .......... *H01M 10/0562* (2013.01); *C03C 3/321* (2013.01); *H01M 10/052* (2013.01); *H01M 2220/20* (2013.01); *H01M 2220/30* (2013.01); *H01M 2300/0068* (2013.01); *Y02E 60/122* (2013.01); *Y02P 70/54* (2015.11); *Y02T 10/7011* (2013.01)

(58) Field of Classification Search
CPC ............ H01M 10/052; H01M 10/0562; H01M 2220/20; H01M 10/30
See application file for complete search history.

(56) References Cited

U.S. PATENT DOCUMENTS

| | | |
|---|---|---|
| 2008/0057390 A1 | 3/2008 | Kondo et al. |
| 2011/0065007 A1 | 3/2011 | Kamiya et al. |
| 2012/0216394 A1 | 8/2012 | Kitaura et al. |
| 2013/0164631 A1 | 6/2013 | Ohtomo et al. |

FOREIGN PATENT DOCUMENTS

| | | |
|---|---|---|
| CN | 101136495 A | 3/2008 |
| CN | 105830269 A | 8/2016 |
| EP | 3089254 A1 | 11/2016 |
| JP | 2008103284 A | 5/2008 |

(Continued)

*Primary Examiner* — James Sanders
(74) *Attorney, Agent, or Firm* — Oliff PLC (57) ABSTRACT

The invention provides a method of producing a solid state lithium battery module in which the occurrence of short circuit caused by dendrites is suppressed. The invention solves this problem by providing a method of producing a solid state lithium battery module, including steps of: a pressing step of pressing a sulfide glass having an ion conductor containing a Li element, a P element, and a S element, and forming a solid electrolyte layer; and a restraining step of restraining a solid state lithium battery including the solid electrolyte layer, using restraining member, wherein, in the pressing step, the solid electrolyte layer is formed such that the average pore radius obtained by a mercury intrusion method is R ($\mu$m), and in the restraining step, the solid state lithium battery is restrained such that when the confining pressure is designated as P(MPa), the relationship: $P \leq -5900R+74$ is satisfied.

4 Claims, 5 Drawing Sheets

(56) References Cited

FOREIGN PATENT DOCUMENTS

| | | | |
|---|---|---|---|
| JP | 2009-176541 | A | 8/2009 |
| JP | 201160649 | A | 3/2011 |
| JP | 2011-159534 | A | 8/2011 |
| JP | 2012-048973 | A | 3/2012 |
| JP | 2012-199003 | A | 10/2012 |
| JP | 201316280 | A | 1/2013 |
| JP | 2013-089470 | | 5/2013 |
| JP | 2013-089471 | A | 5/2013 |
| JP | 2013157084 | A | 8/2013 |
| KR | 10-2013-0042580 | A | 4/2013 |
| WO | 2011/052094 | A1 | 5/2011 |

SEPARATOR

FIG. 2B

SOLID ELECTROLYTE LAYER

FIG. 2C

SOLID ELECTROLYTE PARTICLE

METHOD OF PRODUCING SOLID STATE LITHIUM BATTERY MODULE

TECHNICAL FIELD

The present invention relates to a method of producing a solid state lithium battery module in which the occurrence of a short circuit caused by dendrites is suppressed.

BACKGROUND ART

Along with the rapid distribution of information-related equipment and communication equipment such as personal computers, video cameras, and mobile telephones in recent years, development of batteries used as power supplies thereof has been considered important. Furthermore, even in the automotive industry and the like, development of high power output and high capacity batteries for electric vehicles or hybrid vehicles is in progress. Currently, among various batteries, more attention is paid to lithium batteries from the viewpoint of having a higher energy density.

Lithium batteries that are currently commercially available use liquid electrolytes containing flammable organic solvents, and therefore, installation of safety devices that suppress temperature increases at the time of short circuit, or a structure for preventing short circuit is needed. In this regard, it is believed that since a lithium battery that has been converted to an all solid state battery by changing the liquid electrolyte to a solid electrolyte layer, does not use a flammable organic solvent within the battery, simplification of the safety device can be attempted, and the battery is superior in terms of product cost or productivity.

Furthermore, in the field of lithium batteries, it is known that short circuit caused by dendrites occurs. A short circuit occurs when, at the time of charging, Li that has been precipitated in the anode active material layer grows in the direction of the cathode active material layer, and the anode active material layer and the cathode active material layer are physically brought into contact. In order to prevent short circuit, investigations have been conducted. For example, Patent Literature 1 discloses a method of producing a non-aqueous electrolyte battery, the method comprises a step of forming a first solid layer by heating a powder of an amorphous solid electrolyte; and a step of forming a second solid layer on the first solid layer by a gas phase method. On the other hand, Patent Literature 2 discloses a $Li_2S$—$P_2S_5$—LiI-based sulfide solid electrolyte material.

CITATION LIST

Patent Literature

Patent Literature 1: Japanese Patent Application Laid-Open No. 2013-089470
Patent Literature 2: Japanese Patent Application Laid-Open No. 2012-048973

SUMMARY OF INVENTION

Technical Problem

It is demanded that the occurrence of short circuit caused by dendrites be suppressed. The present invention was achieved in view of such circumstances, and an object of the present invention is to provide a method of producing a solid state lithium battery module in which the occurrence of short circuit caused by dendrites is suppressed.

Solution to Problem

In order to solve the problems described above, according to the present invention, there is provided a method of producing a solid state lithium battery module, the solid state lithium battery module comprises: a solid state lithium battery including a cathode active material layer containing a cathode active material, an anode active material layer containing an anode active material, and a solid electrolyte layer formed between the cathode active material layer and the anode active material layer; and a restraining member to apply a confining pressure in a thickness direction of the solid state lithium battery, the method of producing a solid state lithium battery module comprising steps of: a pressing step of pressing a sulfide glass having an ion conductor containing a Li element, a P element and a S element, and forming the solid electrolyte layer; and a restraining step of restraining the solid state lithium battery including the solid electrolyte layer using the restraining member, wherein, in the pressing step, the solid electrolyte layer is formed such that an average pore radius obtained by a mercury intrusion method is R (μm), and in the restraining step, the solid state lithium batteries are restrained such that when the confining pressure is designated as P (MPa), the relationship: $P \leq -5900R+74$ is satisfied.

According to the present invention, when a predetermined sulfide glass is used, and the confining pressure P is determined by considering the average pore radius R of the solid electrolyte layer, a solid state lithium battery module in which the occurrence of short circuit caused by dendrites is suppressed can be obtained.

According to the invention described above, it is preferable to restrain the battery module so as to satisfy the relationship: $-6400R+47 \leq P$.

Furthermore, according to the present invention, there is provided a method of producing a solid state lithium battery module, the solid state lithium battery module comprises: a solid state lithium battery including a cathode active material layer containing a cathode active material, an anode active material layer containing an anode active material, and a solid electrolyte layer formed between the cathode active material layer and the anode active material layer; and a restraining member to apply a confining pressure in the thickness direction of the solid state lithium battery, the method of producing a solid state lithium battery module comprising steps of: a pressing step of pressing a sulfide glass having an ion conductor containing a Li element, a P element and a S element, and forming the solid electrolyte layer; and a restraining step of restraining the solid state lithium battery containing the solid electrolyte layer using the restraining member, wherein, in the pressing step, the solid electrolyte layer is formed such that a filling ratio is F (%), and in the restraining step, the solid state lithium battery is restrained such that when the confining pressure is designated as P (MPa), the relationship: $P \leq 8.9F-790$ is satisfied.

According to the present invention, when a predetermined sulfide glass is used, and the confining pressure P is determined by considering the filling ratio F of the solid electrolyte layer, a solid state lithium battery module in which the occurrence of short circuit caused by dendrites is suppressed can be obtained.

In the above-described invention, it is preferable to restrain the solid state lithium battery so as to satisfy the relationship: $7.4F-680 \leq P$.

According to the present invention, it is preferable that the sulfide glass contains the ion conductor described above and LiI, the ion conductor has a $PS_4^{3-}$ structure, a proportion of the $PS_4^{3-}$ structure with respect to an overall anion structure of the ion conductor be 50 mol % or more, and a proportion of LiI be in the range of 20 mol % to 30 mol %.

Advantageous Effects of Invention

According to the present invention, there is provided an effect that a solid state lithium battery module in which the occurrence of short circuit caused by dendrites is suppressed can be obtained.

DESCRIPTION OF EMBODIMENTS

Hereinafter, the method of producing a solid state lithium battery module of the present invention will be described in detail.

The method of producing a solid state lithium battery module of the present invention can be roughly divided into two embodiments. Hereinafter, the method of producing a solid state lithium battery module of the present invention will be explained separately as a first embodiment and a second embodiment.

1. First Embodiment

Figure 1:
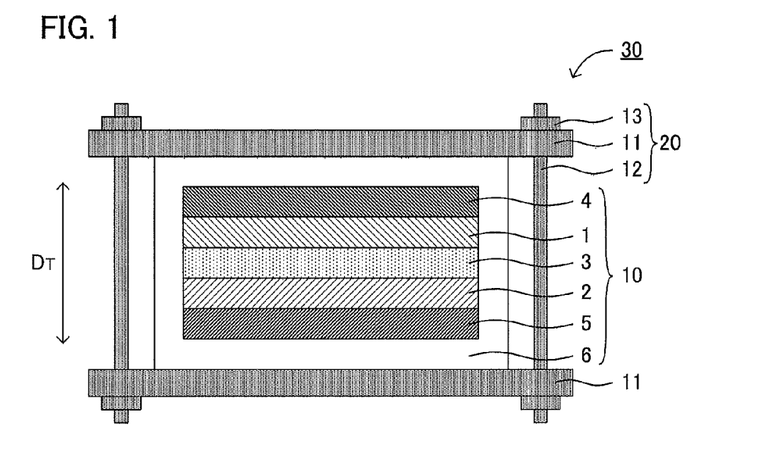
FIG. 1 is an outline cross-sectional diagram illustrating an example of a solid state lithium battery module according to the present invention.

FIG. 1 is an outline cross-sectional diagram illustrating an example of a solid state lithium battery module obtained by the production method of the first embodiment. A solid state lithium battery module 30 shown in FIG. 1 comprises a solid state lithium battery 10, and a restraining member 20 that applies a confining pressure in the thickness direction $D_T$ to the solid state lithium battery 10. The solid state lithium battery 10 includes a cathode active material layer 1 containing a cathode active material; an anode active material layer 2 containing an anode active material; a solid electrolyte layer 3 formed between the cathode active material layer 1 and the anode active material layer 2; a cathode current collector 4 that performs current collection of the cathode active material layer 1; an anode current collector 5 that performs current collection of the anode active material layer 2; and a battery case 6 that accommodates these members.

On the other hand, the restraining member 20 includes plate-shaped units 11 that have the two surfaces of the solid state lithium battery 10 interposed therebetween; rod-shaped units 12 that connect the two plate-shaped units 11; and adjusting units 13 that are connected to the rod-shaped units 12 and adjust the confining pressure by means of a screw structure or the like. Incidentally, the restraining member may be subjected to a necessary insulating treatment so that the cathode and the anode are not short-circuited. According to the first embodiment, a solid electrolyte layer 3 containing a predetermined sulfide glass is formed. At this time, the average pore radius of the solid electrolyte layer 3 is adjusted to be R (μm). Thereafter, the confining pressure P (MPa) of the restraining member 20 is adjusted to be in a particular range that is dependent on the average pore radius R (μm).

Figure 2A:
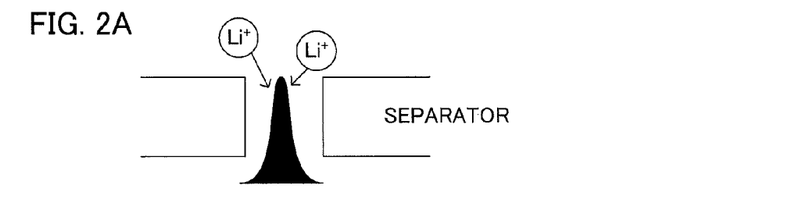
FIGS. 2A to 2C are schematic diagrams each explaining the growth of dendrites.

According to the first embodiment, when a predetermined sulfide glass is used, and the confining pressure P is determined by considering the average pore radius R of the solid electrolyte layer, a solid state lithium battery module in which the occurrence of short circuit caused by dendrites is suppressed can be obtained. Here, Reference Literature 1 discloses a method of producing a non-aqueous electrolyte battery intended for preventing short circuit, however, it is contemplated that a battery using a liquid electrolyte and a battery using a solid electrolyte layer have completely different mechanisms of suppressing and growth of dendrites. Specifically, as illustrated in FIG. 2A, in a battery using a liquid electrolyte, dendrites and the liquid electrolyte are always in contact, and Li is continuously supplied from the liquid electrolyte. Therefore, dendrites grow continuously. Furthermore, in a battery using a liquid electrolyte, precipitated lithium metal reacts with the liquid electrolyte, and the solid-electrolyte interface (SEI) is generated at the surface. Thus, it is contemplated that when the SEI is actively generated at the lithium surface by making the pores of the separator smaller and decreasing the size of precipitated lithium, and thereby the system is made non-conductive, the growth of dendrites can be suppressed.

Figure 2B:
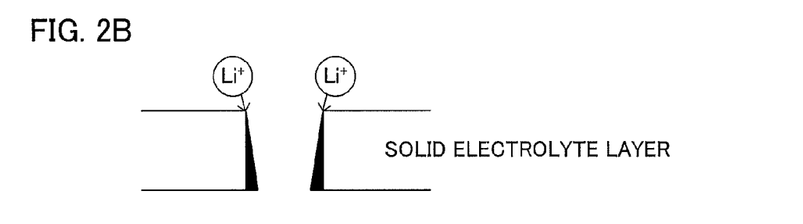
Figure 2C:
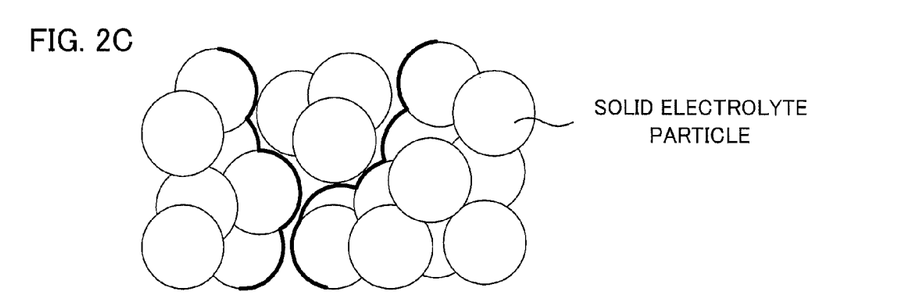

On the contrary, as illustrated in FIG. 2B, in a battery using a solid electrolyte layer, dendrites grow so as to creep over the surface of the solid electrolyte particles. In a battery using a solid electrolyte layer composed of a solid electrolyte material that is stable against lithium metal, since precipitated lithium exists in an active form, it is contemplated that lithium metal can grow more easily compared with batteries using liquid electrolytes. Therefore, in a battery using a solid electrolyte layer, it is contemplated that it is necessary to make the pores so small that lithium metal cannot grow (the filling ratio is increased), or to make the cross-sectional area of precipitated lithium smaller as the electron conductivity of lithium metal is smaller than the ion conductivity of the solid electrolyte. Thus, the control of pores in the solid electrolyte layer is accompanied by a far much higher degree of difficulty than in the case of using a liquid electrolyte. Incidentally, when a solid electrolyte material which is unstable against lithium metal is used, there is a problem that lithium metal undergoes an irreversible reaction and discharging cannot occur, or the ion conductivity of the solid electrolyte material is decreased. As such, a battery using a liquid electrolyte and a battery using a solid electrolyte layer have completely different mechanisms of suppressing and growth of dendrites. Furthermore, as illustrated in FIG. 2C, in an actual solid electrolyte layer, solid electrolyte particles are disposed three-dimensionally, and thus the paths of dendrite growth are also complicated.

Furthermore, in a case in which the occurrence of short circuit caused by dendrites is suppressed only by the density of the solid electrolyte layer, it is necessary to increase the density of the solid electrolyte layer extremely high. However, it is difficult to mold a solid electrolyte layer having such high density, using a conventional molding apparatus. Furthermore, it is suggested from the results of Examples and Comparative Examples described below that when a confining pressure is applied to a lithium battery, short circuit is likely to occur. Particularly when Li metal is used as an active material, since Li metal is soft, it is speculated that Li metal penetrates into the pores of the solid electrolyte layer due to the confining pressure, and short circuit may occur easily. No finding has been hitherto known on the relationship between the compactness (average pore radius and filling ratio) of the solid electrolyte layer and the confining pressure. However, in the first embodiment, a certain relationship has been found, and it has been found that short circuit can be effectively suppressed without increasing the density of the solid electrolyte layer very high.

Hereinbelow, different steps of the method of producing a solid state lithium battery module of the first embodiment will be described.

(1) Pressing Step

A pressing step according to the first embodiment is a step of pressing a sulfide glass having an ion conductor containing a Li element, a P element and a S element, and forming the solid electrolyte layer.

Figure 3A:
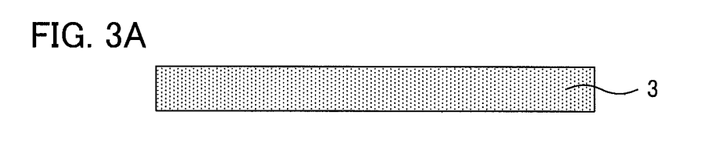
FIGS. 3A to 3C are outline cross-sectional diagrams illustrating an example of the method of producing a solid state lithium battery according to the present invention.
Figure 3B:
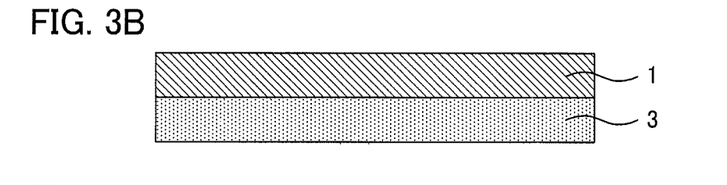
Figure 3C:
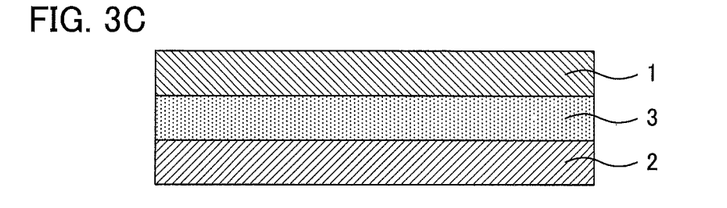

FIGS. 3A to 3C are outline cross-sectional diagrams illustrating an example of the pressing step according to the first embodiment. In FIGS. 3A to 3C, first, a sulfide glass having a composition of 30LiI.70 (0.75Li$_2$S.0.25P$_2$S$_5$) is pressed, and a solid electrolyte layer 3 is formed (FIG. 3A). Next, a cathode active material layer 1 is formed by disposing a cathode material containing a cathode active material on one surface of the solid electrolyte layer 3, and pressing the assembly (FIG. 3B). Next, an anode active material layer 2 is formed by disposing an anode material containing an anode active material on the other surface of the solid electrolyte layer 3, and pressing the assembly (FIG. 3C).

Here, the pressing step according to the first embodiment does not merely mean the step of forming the solid electrolyte layer only, but means the entire step of forming a member including the solid electrolyte layer. To explain this using FIGS. 3A to 3C described above, FIG. 3A as well as FIG. 3B and FIG. 3C correspond to the pressing step. The number of times of performing pressing may be one time, or may be several times; however, the step is usually carried out several times.

Furthermore, the order of a solid electrolyte layer forming step of forming a solid electrolyte layer, a cathode active material layer forming step of forming a cathode active material layer, and an anode active material layer forming step of forming an anode active material layer is not particularly limited as long as a desired solid state lithium battery can be obtained, and any arbitrary order can be employed. The solid electrolyte layer forming step and the cathode active material layer forming step may be carried out simultaneously, or the solid electrolyte layer forming step and the anode active material layer forming step may be carried out simultaneously. Furthermore, the solid electrolyte layer forming step, the cathode active material layer forming step, and the anode active material layer forming step may be carried out simultaneously. Also, it is also acceptable to perform pressing while having at least one of a cathode current collector and an anode current collector disposed thereon.

According to the first embodiment, the average pore radius of the solid electrolyte layer is adjusted to be R, by pressing. The average pore radius of the solid electrolyte layer is obtained by a mercury intrusion method. Specifically, as described in Synthesis Example that is described below, the average pore radius can be obtained from a pore distribution curve, by using a pore distribution analyzer. The average pore radius R of the solid electrolyte layer is not particularly limited, but for example, the average pore radius R is 0.0125 µm or less, preferably 0.01 µm or less, more preferably 0.0074 µm, even more preferably 0.006 µm or less, and particularly preferably 0.0051 µm or less.

Examples of the pressing method for the pressing step include flat plate pressing and roll pressing. The maximum pressure applied to the solid electrolyte layer is not particularly limited, but for example, the maximum pressure is 392 MPa or more, preferably 588 MPa or more, and more preferably 785 MPa or more. On the other hand, the maximum pressure applied to the solid electrolyte layer is, for example, 1000 MPa or less.

Incidentally, the average pore radius described above is very small, and the radius is far beyond the level that can be easily obtained when an arbitrary sulfide glass is subjected to pressing at a high pressure. That is, in order to obtain the desired average pore radius described above, not only the pressing conditions, but also the characteristics of the sulfide glass as a material are considered important. No finding has been hitherto known on the moldability of sulfide glass (easy collapsibility of the pores, extent of plastic deformation), and no indices exist. Furthermore, if the moldability of the sulfide glass is poor, even if pressing is performed at a pressure whatsoever high, it is difficult to obtain a desired average pore radius. On the contrary, according to the first embodiment, it was found that a sulfide glass having the Li element, the P element and the S element has satisfactory moldability, and thus, the occurrence of short circuit caused by dendrites could be actually suppressed. The reason why the occurrence of short circuit could be suppressed is that the size of the pores of the solid electrolyte layer is smaller than the size of the tip portions of the dendrites.

(i) Sulfide Glass

The sulfide glass according to the first embodiment is one of sulfide solid electrolyte materials, and has an ion conductor containing the Li element, the P element and the S element. Furthermore, the sulfide glass according to the first embodiment means an amorphous body in a broad sense. For that reason, a material for which, when the material has been amorphized, for example, a portion of the raw material (for example, LiI that will be described below) remains, and peaks are observed in X-ray diffraction, is also included in the sulfide glass according to the first embodiment. Among others, the sulfide glass according to the first embodiment is preferably such that no peaks are observed in X-ray diffraction.

The ion conductor according to the first embodiment is usually configured to have an anion structure containing Li cations, P and S. Among others, the ion conductor according to the first embodiment is preferably an ion conductor which has a PS$_4^{3-}$ structure as a main body of the anion structure (50 mol % or more). Among them, the proportion of the PS$_4^{3-}$ structure with respect to the overall anion structure of the ion conductor is preferably 60 mol % or more, more preferably 70 mol % or more, even more preferably 80 mol % or more, and particularly preferably 90 mol % or more. Incidentally, the proportion of the $PS_4^{3-}$ structure can be determined by Raman spectroscopy, NMR, XPS, and the like.

Furthermore, the sulfide glass according to the first embodiment usually has the ion conductor as a main body. The proportion of the ion conductor in the sulfide glass is preferably 65 mol % or more, more preferably 70 mol % or more, and even more preferably 75 mol % or more. Furthermore, the sulfide glass may be composed only of the ion conductor, or may contain other components. Examples of the other components include LiI. When the sulfide glass has the ion conductor and LiI, a solid electrolyte layer having enhanced moldability of the sulfide glass (easy collapsibility of the pores) and having a smaller average pore radius can be obtained. LiI usually exists in a state of being incorporated into the structure of the ion conductor. More specifically, it is contemplated that LiI is dispersed microscopically (in a state of being physically inseparable) around the anion structure of the ion conductor (for example, $PS_4^{3-}$)

The proportion of LiI is, for example, 5 mol % or more, preferably 10 mol % or more, and more preferably 20 mol % or more. On the other hand, the proportion of LiI is, for example, 35 mol % or less, and preferably 30 mol % or less; Particularly in the first embodiment, it is preferable that the sulfide glass has the composition of $xLiI.(100-x)(yLi_2S.(1-y) P_2S_5)$ ($20 \le x \le 30$, $0.7 \le y \le 0.8$). Incidentally, "y" is preferably 0.72 or more, and more preferably 0.74 or more. Also, "y" is preferably 0.78 or less, and more preferably 0.76 or less.

It is preferable that the sulfide glass according to the first embodiment does not substantially contain $Li_2S$. It is because a sulfide glass having a less amount of hydrogen sulfide generation can be obtained. When $Li_2S$ reacts with water, hydrogen sulfide is generated. For example, if the proportion of $Li_2S$ included in the raw material composition is large, $Li_2S$ is likely to remain. The issue of "(does) not substantially contain $Li_2S$" can be confirmed by X-ray diffraction. Specifically, in a case in which the sulfide glass does not have the peaks of $Li_2S$ ($2\theta=27.0°$, $31.2°$, $44.8°$, $53.1°$), it may be considered that the sulfide glass does not substantially contain $Li_2S$.

It is preferable that the sulfide glass according to the first embodiment does not substantially contain cross-linking sulfur. It is because a sulfide glass with a less amount of hydrogen sulfide generation can be obtained. "Crosslinked sulfur" refers to cross-linking sulfur in a compound formed as a result of a reaction between $Li_2S$ and sulfide of P. For example, cross-linking sulfur having a $S_3P—S—PS_3$ structure formed as a result of a reaction between $Li_2S$ and $P_2S_5$ corresponds to the cross-linking sulfur. Such cross-linking sulfur is prone to react with water, and hydrogen sulfide can be easily generated. Furthermore, the issue of "(does) not substantially contain cross-linking sulfur" can be confirmed by an analysis of the Raman spectroscopic spectrum. For example, the peak of the $S_3P—S—PS_3$ structure usually appears at 402 $cm^{-1}$. Therefore, it is preferable that this peak be not detected. Also, the peak of the $PS_4^{3-}$ structure usually appears at 417 $cm^{-1}$. In the first embodiment, it is preferable that the intensity $I_{402}$ at 402 $cm^{-1}$ be smaller than the intensity $I_{417}$ at 417 $cm^{-1}$. More specifically, the intensity $I_{402}$ is preferably, for example, 70% or less, more preferably 50% or less, and still more preferably 35% or less, relative to the intensity $I_{417}$.

The sulfide glass according to the first embodiment is preferably obtained by amorphizing a raw material composition containing $Li_2S$ and sulfide of P (phosphorus). The raw material composition may contain only $Li_2S$ and sulfide of P (phosphorus), or may further contain other compounds. Examples of the other compounds include LiX (in which X represents F, Cl, Br or I). Among them, it is preferable that the sulfide glass according to the first embodiment be obtained by amorphizing a raw material composition containing $Li_2S$, sulfide of P (phosphorus), and LiI. It is preferable that $Li_2S$ has a less amount of impurities. It is because side reaction can be suppressed. On the other hand, examples of the sulfide of P (phosphorus) include $P_2S_3$ and $P_2S_5$. Incidentally, simple substance of P and simple substance of S may also be used instead of the sulfide of P (phosphorus). Also, examples of the method for amorphizing include a mechanical milling method and a melt quenching method. Examples of the mechanical milling include a ball mill, a vibration mill, a turbo mill, a Mechanofusion, and a disc mill. Also, the mechanical milling may be carried out in a dry mode, or may be carried out in a wet mode; however, the latter is preferred. It is because a sulfide glass having high uniformity can be obtained.

When the raw material composition contains $Li_2S$ and $P_2S_5$, the ratio for obtaining a stoichiometric ortho-composition is $Li_2S:P_2S_5=75:25$ on a molar basis. Here, the term ortho generally denotes the most highly hydrated oxoacid among the oxoacids that are obtained through hydration of one same oxide. According to the first embodiment, the crystal composition in which $Li_2S$ has been added most in the sulfide is referred to as the ortho-composition. For example, in the $Li_2S—P_2S_5$ system, $Li_3PS_4$ corresponds to the ortho-composition. When the raw material composition contains $Li_2S$ and $P_2S_5$, the proportion of $Li_2S$ with respect to the sum of $Li_2S$ and $P_2S_5$ is preferably in the range of 70 mol % to 80 mol %, more preferably in the range of 72 mol % to 78 mol %, and even more preferably in the range of 74 mol % to 76 mol %.

It is preferable that the sulfide glass according to the first embodiment has a glass transition point. It is because when the amorphousness is increased to the extent of having a glass transition point, the Li ion conductivity is further enhanced. The presence or absence of the glass transition point can be checked by a differential thermal analysis (DTA).

The shape of the sulfide glass according to the first embodiment may be, for example, a particulate shape. The average particle size ($D_{50}$) of the sulfide glass is, for example, 0.01 μm or more, and an average particle size of 0.1 μm or more is preferred. On the other hand, the average particle size ($D_{50}$) of the sulfide glass is, for example, 50 μm or less, and preferably 30 μm or less. Also, it is preferable that the sulfide glass according to the first embodiment have high Li ion conductivity, and the Li ion conductivity at normal temperature (25° C.) is, for example, preferably $1\times10^{-4}$ S/cm or higher, and more preferably $1\times10^{-3}$ S/cm or higher.

(ii) Solid Electrolyte Layer

The solid electrolyte layer according to the first embodiment may be composed only of the sulfide glass described above, or may contain other components. Examples of the other components include a binding material that is described below. The proportion of the sulfide glass included in the solid electrolyte layer is, for example, 50 vol % or more, preferably 60 vol % or more, more preferably 70 vol % or more, even more preferably 80 vol % or more, and particularly preferably 90 vol % or more. Furthermore, the thickness of the solid electrolyte layer is, for example, in the range of 0.1 µm to 1000 µm, and preferably in the range of 0.1 µm to 300 µm.

(2) Restraining Step

A restraining step according to the first embodiment is a step of restraining the solid state lithium battery including the solid electrolyte layer, using the restraining member.

According to the first embodiment, the solid state lithium battery is usually restrained such that when the confining pressure is designated as P, the relationship: $P \leq -5900R+74$ is satisfied. That is, the confining pressure P of the restraining member is adjusted so that the confining pressure P is in a particular range that is dependent on the average pore radius R, and the pressure is maintained. Furthermore, the confining pressure P is preferably such that, for example, the relationship: $-6400R+47 \leq P$ is satisfied, and more preferably such that the relationship: $-3800R+46 \leq P$ is satisfied. It is because the coulomb efficiency is increased. The confining pressure (surface pressure) according to the first embodiment is not particularly limited, but for example, the confining pressure is 0.1 MPa or more, preferably 1 MPa or more, more preferably 10 MPa or more, and even more preferably 15 MPa or more. When a large confining pressure is employed, there is an advantage that the contact between particles, such as the contact between the active material particles and the electrolyte particles, can be maintained easily. On the other hand, the confining pressure (surface pressure) is, for example, 100 MPa or less, and preferably 50 MPa or less. It is because if the confining pressure is too high, the restraining member is required to have high rigidity, and there is a possibility for extension of the module size. Also, if the confining pressure is too high, a soft electrode material such as lithium metal has a possibility of being press-fitted into the cathode side and causing a short circuit.

(3) Solid State Lithium Battery Module

The solid state lithium battery module obtained by the first embodiment comprises a solid state lithium battery and a restraining member. Furthermore, the solid state lithium battery usually includes a cathode active material layer containing a cathode active material, an anode active material layer containing an anode active material, and a solid electrolyte layer formed between the cathode active material layer and the anode active material layer.

(i) Solid Electrolyte Layer

In regard to the solid electrolyte layer according to the first embodiment, the same matters described in the above section "1. Pressing step" are applicable, and thus any further description will not be repeated here.

(ii) Anode Active Material Layer

The anode active material layer according to the first embodiment is a layer containing at least an anode active material, and may optionally contain at least one of a solid electrolyte material, a conductive material, and a binding material.

The anode active material is not particularly limited as long as dendrites can be generated at the time of charging. On the other hand, whether dendrites are actually generated or not is significantly affected by the current density at the time of charging. For example, when the current density at the time of charging is made extremely large, dendrites are generated in many cases. Furthermore, for example, when the Li insertion potential of the anode active material is low, dendrites are prone to be generated at the time of charging. The Li insertion potential of the anode active material is preferably, for example, 1.5 V (vs Li/Li$^+$) or less, and more preferably 0.5 V (vs Li/Li$^+$) or less. Incidentally, the Li insertion potential of the anode active material can be determined by, for example, cyclic voltammetry.

Examples of the anode active material include lithium metal; lithium alloys such as a lithium-aluminum alloy, a lithium-tin alloy, a lithium-lead alloy, and a lithium-silicon alloy; metal oxides such as tin oxide, silicon oxide, lithium titanium oxide, niobium oxide, and tungsten oxide; metal sulfides such as tin sulfide and titanium sulfide; metal nitrides such as lithium cobalt nitride, lithium iron nitride, and lithium manganese nitride; and carbon materials such as graphite.

The anode active material layer may contain a solid electrolyte material. When a solid electrolyte material is used, ion conductivity of the anode active material layer can be enhanced. There are no particular limitations on the kind of the solid electrolyte material, but for example, sulfide solid electrolyte materials may be used. Examples of the sulfide solid electrolyte material include $Li_2S$—$P_2S_5$, $Li_2S$—$P_2S_5$—LiI, $Li_2S$—$P_2S_5$—LiCl, $Li_2S$—$P_2S_5$—LiBr, $Li_2S$—$P_2S_5$—$Li_2O$, $Li_2S$—$P_2S_5$—$Li_2O$—LiI, $Li_2S$—$SiS_2$, $Li_2S$—$SiS_2$—LiI, $Li_2S$—$SiS_2$—LiBr, $Li_2S$—$SiS_2$—LiCl, $Li_2S$—$SiS_2$—$B_2S_3$—LiI, $Li_2S$—$SiS_2$—$P_2S_5$—LiI, $Li_2S$—$B_2S_3$, $Li_2S$—$P_2S_5$—$Z_mS_n$ (provided that "m" and "n" each represent a positive number; and Z represents any one of Ge, Zn, and Ga), $Li_2S$—$GeS_2$, $Li_2S$—$SiS_2$—$Li_3PO_4$, $Li_2S$—$SiS_2$—$Li_xMO_y$ (provided that "x" and "y" each represent a positive number; and M represents any one of P, Si, Ge, B, Al, Ga, and In), and $Li_{10}GeP_2S_{12}$. The solid electrolyte material may be amorphous, may be crystalline, or may be glass ceramic.

The anode active material layer may further contain a conductive material. Conductivity of the anode active material layer can be enhanced through the addition of the conductive material. Examples of the conductive material include acetylene black, Ketjen black, and carbon fiber. Furthermore, the anode active material layer may contain a binding material. Examples of the kind of the binding material include fluorine-containing binding materials such as polyvinylidene fluoride (PVDF). Also, examples of the form of the anode active material layer include a mixture, a thin film, and a sintered body. The thickness of the anode active material layer is, for example, preferably in the range of 0.1 µm to 1000 µm.

(iii) Cathode Active Material Layer

The cathode active material layer according to the first embodiment is a layer containing at least a cathode active material, and may optionally contain at least one of a solid electrolyte material, a conductive material, and a binding material. Examples of the cathode active material include oxide active materials, and specific examples thereof include rock salt bed type active materials such as $LiCoO_2$, $LiMnO_2$, $LiNiO_2$, $LiVO_2$, $LiNi_{1/3}Co_{1/3}Mn_{1/3}O_2$; spinel type active materials such as $LiMn_2O_4$ and Li $(Ni_{0.5}Mn_{1.5})$ $O_4$; and olivine type active materials such as $LiFePO_4$, $LiMnPO_4$, $LiNiPO_4$, and $LiCuPO_4$. Furthermore, Si-containing oxides such as $Li_2FeSiO_4$ and $Li_2MnSiO_4$ may also be used as the cathode active material. Also, the surface of the cathode active material may be coated with a coating layer. It is because the reaction between the cathode active material and the solid electrolyte material can be suppressed. Examples of the material of the coating layer include Li ion conductive oxides such as $LiNbO_3$.

Incidentally, in regard to the solid electrolyte material, conductive material, and binding material used in the cathode active material layer, the same matters as in the case of the anode active material layer described above are applicable. Furthermore, examples of the form of the cathode active material layer include a mixture, a thin film, and a sintered body. The thickness of the cathode active material layer is, for example, preferably in the range of 0.1 µm to 1000 µm.

(iv) Current Collector and Case

The solid state lithium battery according to the first embodiment includes at least the solid electrolyte layer, the anode active material layer, and the cathode active material layer described above. Furthermore, the solid state lithium battery usually includes a cathode current collector that performs current collection of the cathode active material layer; and an anode current collector that performs current collection of the anode active material layer. Examples of the material for the cathode current collector include SUS, aluminum, nickel, iron, titanium, and carbon. On the other hand, examples of the material for the anode current collector include SUS, copper, nickel, and carbon. It is preferable that the thickness, shape and the like of the cathode current collector and the anode current collector be appropriately selected according to factors such as the applications of the battery. Furthermore, for the battery case, any battery case for general batteries can be used. Examples of the battery case include battery cases made of SUS.

(v) Solid State Lithium Battery

The solid state lithium battery according to the first embodiment may be a primary battery, or may be a secondary battery; however, among them, it is preferable that the solid state lithium battery be a secondary battery. It is because the solid state lithium battery can be repeatedly charged and discharged, and is useful as, for example, a battery for vehicle installation. Examples of the shape of the solid state lithium battery include a coin shape, a laminate shape, a cylindrical shape, and a square shape. Also, a solid state lithium battery is appropriate for high-rate charging because the occurrence of short circuit caused by dendrites can be suppressed. The solid state lithium battery may have a charging control unit that controls the charging rate. The charging rate is, for example, preferably 1 C or higher, more preferably 3 C or higher, and even more preferably 5 C or higher.

(vi) Restraining Member

The restraining member according to the first embodiment is not particularly limited as long as the member is capable of applying a confining pressure in the thickness direction to the solid state lithium battery, and any general confining member can be used.

(vii) Others

In the first embodiment, a solid state lithium battery module characterized by being obtained by the production method described above can also be provided. Furthermore, the solid state lithium battery module is such that in the predetermined charge-discharge analysis described in the following Examples, the coulomb efficiency is preferably 60% or higher, more preferably 70% or higher, and even more preferably 80% or higher.

2. Second Embodiment

FIG. 1 is also an outline cross-sectional diagram illustrating an example of the solid state lithium battery module obtainable by the production method for the second embodiment, similarly to the first embodiment. In the second embodiment as well, a solid electrolyte layer 3 containing a predetermined sulfide glass is formed. At this time, the filling ratio of the solid electrolyte layer 3 is adjusted to be F (%). Thereafter, the confining pressure P (MPa) of a restraining member 20 is adjusted to be in a particular range that is dependent on the filling ratio F (%).

According to the second embodiment, when a predetermined sulfide glass is used, and the confining pressure P is determined by considering the filling ratio F of the solid electrolyte layer, a solid state lithium battery module in which the occurrence of short circuit caused by dendrites is suppressed can be obtained.

Hereinbelow, different steps of the method of producing a solid state lithium battery module of the second embodiment will be described. Incidentally, in regard to the method of producing a solid state lithium battery module of the second embodiment, the same matters described in the first embodiment are basically applicable except for the matters related to the filling ratio, and thus, any further description will not be repeated here.

(1) Pressing Step

A pressing step according to the first embodiment is a step of pressing a sulfide glass having an ion conductor containing the Li element, the P element, and the S element, and forming the solid electrolyte layer.

In the second embodiment, the filling ratio of the solid electrolyte layer is adjusted to be F through pressing. The filling ratio of the solid electrolyte layer is calculated from a comparison between the true density determined by the Archimedean method and the apparent density calculated from the thickness and weight of the pellet. The filling ratio F of the solid electrolyte layer is not particularly limited, but the filling ratio is, for example, 89% or more, preferably 90% or more, more preferably 92% or more, and even more preferably 94% or more.

(2) Restraining Step

A restraining step according to the first embodiment is a step of restraining the solid state lithium battery including the solid electrolyte layer, using the restraining member.

According to the second embodiment, the solid state lithium battery is usually restrained such that when the confining pressure is designated as P, the relationship: $P \leq 8.9F-790$ is satisfied. That is, the confining pressure P of the restraining member is adjusted to be in a particular range that is dependent on the filling ratio F, and the pressure is maintained. Furthermore, it is preferable that the confining pressure P satisfies, for example, the relationship: $7.4F-680 \leq P$, and more preferably the relationship: $5.8F-520 \leq P$. It is because the coulomb efficiency is increased.

Incidentally, the present invention is not intended to be limited to the embodiments described above. The above embodiments are only for the purpose of illustration, and any variations having substantially the same configuration as the technical idea described in the claims of the present invention and providing the same operating effects, are considered to be included in the technical scope of the present invention.

EXAMPLES

Hereinafter, the present invention will be described more specifically by way of Examples.

Synthesis Example

Synthesis of Sulfide Glass

As starting raw materials, lithium sulfide ($Li_2S$, purity 99.9%, manufactured by Nippon Chemical Industrial Co., Ltd.), diphosphorus pentasulfide ($P_2S_5$, purity 99.9%, manufactured by Sigma-Aldrich Co. LLC.), and lithium iodide (LiI, purity 99.9%, manufactured by Sigma-Aldrich Co. LLC.) were used. Next, in a glove box in an Ar atmosphere (dew point: −70° C.), $Li_2S$, $P_2S_5$ and LiI were mixed at a composition ratio of $30LiI.70(0.75Li_2S.0.25P_2S_5)$. Introduced into the container (45 cc, made of $ZrO_2$) of a planetary ball mill was 2 g of this mixture, dehydrated heptane (amount of moisture 30 ppm or less, 4 g) was introduced therein, $ZrO_2$ balls (φ=5 mm, 53 g) was further introduced therein, and the container was completely sealed (Ar atmosphere). This container was mounted on a planetary ball mill machine (P7™ manufactured by Fritsch Japan Co., Ltd.), and 40 cycles of mechanical milling were performed at a speed of tray rotation of 500 rpm, with each cycle including one-hour treatment and 15-minute rest. Thereafter, a sample thus obtained was dried on a hot plate so as to remove heptane, and thus a sulfide glass $(30LiI.70 (0.75Li_2S.0.25P_2S_5)$, $D_{50}$=25 μm) was obtained.

[Evaluation]

Figure 4:
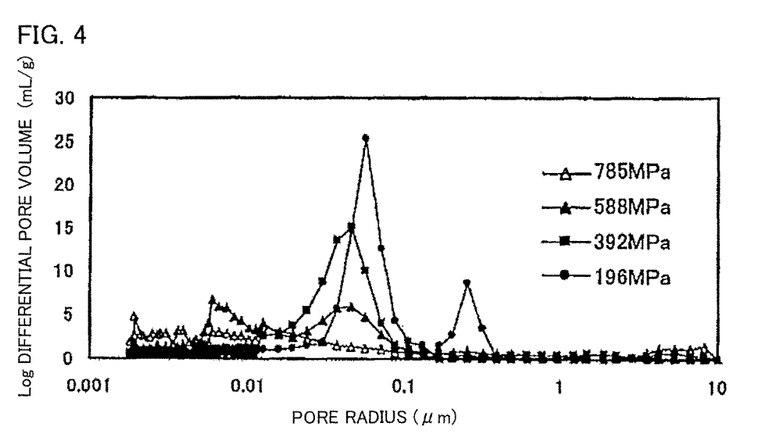
FIG. 4 is a graph showing the pore radius of a solid electrolyte layer using a sulfide glass obtained in Synthesis Example.

The sulfide glass thus obtained was pressed to form a solid electrolyte layer, and the pore distribution of the solid electrolyte layer was measured by a mercury intrusion method. Incidentally, the molding pressure was set at 785 MPa, 588 MPa, 392 MPa, and 196 MPa. The measurement was carried out using a pore distribution analyzer (AUTOPORE IV9520™ manufactured by Micromeritics Instrument Corp.), inside a simple glove bag purged to a dry Ar atmosphere. The pore diameter was calculated using Washburn's formula, and the average pore radius was determined from a pore distribution curve thus obtained.

Washburn's formula: $PD=-4\sigma \cos \theta$ (P: pressure, D: pore diameter, σ: surface tension of mercury, θ: contact angle between mercury and sample)

The results are presented in FIG. 4 and Table 1. As shown in FIG. 4 and Table 1, it was confirmed that as the molding pressure increased, the average pore radius was decreased.

Furthermore, the filling ratio of the solid electrolyte layer in a state that a molding pressure had been applied was determined. The filling ratio was calculated from a comparison between the true density determined by the Archimedean method and the apparent density calculated from the thickness and weight of the pellet. The true density of the $30LiI.70(0.75Li_2S.0.25P_2S_5)$ glass was measured by the Archimedean method, and it was found to be 2.4 g/cm³. On the other hand, the apparent density calculated from the thickness and weight of the solid electrolyte layer molded at a molding pressure of, for example, 785 MPa was 2.26 g/cm³. Therefore, the filling ratio was 94%. The results are presented in Table 1. As shown in Table 1, as the molding pressure increased, the filling ratio was increased, and particularly, at 392 MPa or higher, a high filling ratio such as about 90% or higher was obtained.

TABLE 1

| Molding pressure (MPa) | Average pore radius (μm) | Filling ratio (%) |
|---|---|---|
| 785 | 0.0051 | 94 |
| 588 | 0.0074 | 92 |
| 392 | 0.0125 | 89 |
| 196 | 0.0229 | 77 |

Example 1

A cathode active material ($LiNi_{1/3}Co_{1/3}Mn_{1/3}O_2$, ternary bed type active material, $D_{50}$=4 μm to 6 μm, manufactured by Nichia Corp.) was prepared. On the surface of this cathode active material, a coating layer (average thickness 10 nm) composed of $LiNbO_3$ was formed using a rolling flow coating apparatus (manufactured by Powrex Corp.). The cathode active material having a coating layer formed thereon, the sulfide glass obtained in Synthesis Example, and a conductive material (VGCF) were mixed at a weight ratio of cathode active material:sulfide glass:conductive material=73:24:3, and thus a cathode mix was obtained.

Thereafter, 80 mg of the sulfide glass obtained in Synthesis Example was introduced into a cylinder manufactured by MACOR, the sulfide glass was pressed at 98 MPa, and thus a solid electrolyte layer was formed. Next, 17.8 mg of the cathode mix was added on the solid electrolyte layer, the system was pressed at 785 MPa, and thus, a cathode active material layer was formed. Next, two surfaces of the pellet thus obtained were interposed between a piston made of SUS, and the pellet was fastened with bolts. Thus, a battery for evaluation (torque=6 Ncm, surface pressure=44 MPa). Incidentally, in this battery for evaluation, although an anode active material layer is not used, Li metal is precipitated on the SUS surface in a self-forming manner at the time of charging.

Examples 2 to 5 and Comparative Examples 1 to 8

Batteries for evaluation were obtained in the same manner as in Example 1, except that the molding pressure of the solid electrolyte layer and the fastening pressure (confining pressure) of the bolts were changed to the values indicated in Table 2. Incidentally, fastening torques of 4 Ncm and 2 Ncm correspond to surface pressures of 29 MPa and 15 MPa, respectively.

Reference Example 1

A battery for evaluation was obtained in the same manner as in Example 1, except that a predetermined pressing step was carried out instead of fastening with bolts. The predetermined pressing step refers to a pressing step of disposing a Li foil (manufactured by Honjo Chemical Corp., thickness 250 μm) between the solid electrolyte layer and the piston made of SUS, disposing an In foil (manufactured by Nilaco Corp., thickness 100 μm) between the cathode active material layer and the piston made of SUS, and pressing at a pressure of 98 MPa. The contact between the battery pellet and current collectors was secured through this pressing. Incidentally, since fastening with bolts was not conducted, the surface pressure was 0 MPa.

Reference Examples 2 and 3

Batteries for evaluation were obtained in the same manner as in Reference Example 1, except that the molding pressure of the solid electrolyte layer was changed to the values indicated in Table 2.

[Evaluation]

(Charge-Discharge Analysis)

Charge-discharge analyses were carried out using the batteries for evaluation obtained in Examples 1 to 5, Comparative Examples 1 to 8, and Reference Examples 1 to 3. The analysis conditions include 25° C., a current density of 0.2 mAh/cm² (corresponds to 0.1 C), 3.0 V to 4.1 V, and CC charging. In a case in which an internal short circuit occurred, since charging was not ended, charging was ended in 20 hours, and the battery was discharged in that case. Incidentally, the presence or absence of an internal short circuit was determined based on the presence or absence of a rapid voltage drop at the time of charging. Also, the coulomb efficiency was calculated with respect to the charging-discharging capacity.

Figure 5A:
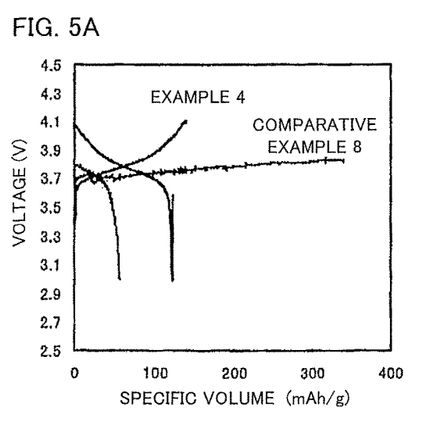
FIGS. 5A and 5B show the results of a charge-discharge analysis of the batteries for evaluation obtained in Example 4 and Comparative Example 8.
Figure 5B:
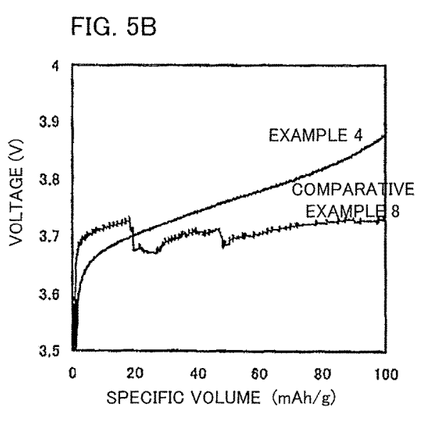

FIGS. 5A and 5B show the results of the charge-discharge analyses of the batteries for evaluation obtained in Example 4 and Comparative Example 8. Incidentally, FIG. 5B is a magnified diagram of FIG. 5A. As shown in FIGS. 5A and 5B, in Example 4, a rapid voltage drop at the time of charging was not observed, and a high coulomb efficiency such as 87% was obtained. On the other hand, in Comparative Example 8, a rapid voltage drop was recognized at the time of charging, and a low coulomb efficiency such as 16% was obtained. As such, it was suggested that in Comparative Example 8, a short circuit caused by Li dendrites was generated at the time of charging, and in Example 4, the relevant short circuit was not generated. The relationship between the presence or absence of short circuit, the charging time taken until the occurrence of short circuit, and the coulomb efficiency is presented in Table 2. Furthermore, the relationship between the molding pressure and the confining pressure is presented in Table 3.

TABLE 2

| | Molding pressure (MPa) | Confining pressure (MPa) | Presence or absence of short circuit | Charging time until short circuit (h) | Coulomb efficiency (%) |
|---|---|---|---|---|---|
| Example 1 | 785 | 44 | Absent | — | 85 |
| Example 2 | 785 | 29 | Absent | — | 86 |
| Example 3 | 785 | 15 | Absent | — | 68 |
| Reference Example 1 | 785 | 0 | Absent | — | 50 |
| Example 4 | 588 | 29 | Absent | — | 87 |
| Example 5 | 588 | 15 | Absent | — | 87 |
| Reference Example 2 | 588 | 0 | Absent | — | 62 |
| Reference Example 3 | 392 | 0 | Absent | — | 75 |
| Comparative Example 1 | 196 | 44 | Present | 1.1 | 3 |
| Comparative Example 2 | 196 | 29 | Present | 2.9 | 9 |
| Comparative Example 3 | 196 | 15 | Present | 3.2 | 10 |
| Comparative Example 4 | 196 | 0 | Present | 5.1 | 21 |
| Comparative Example 5 | 392 | 44 | Present | 0.4 | 4 |
| Comparative Example 6 | 392 | 29 | Present | 2.3 | 8 |
| Comparative Example 7 | 392 | 15 | Present | 1.5 | 9 |
| Comparative Example 8 | 588 | 44 | Present | 1.2 | 16 |

TABLE 3

| | | Molding pressure (MPa) | | | |
|---|---|---|---|---|---|
| | | 196 | 392 | 588 | 785 |
| Confining pressure (MPa) | 44 | Comparative Example 1 (3%, 1.1 h) | Comparative Example 5 (4%, 0.4 h) | Comparative Example 8 (16%, 1.2 h) | Example 1 (85%, —) |
| | 29 | Comparative Example 2 (9%, 2.9 h) | Comparative Example 6 (8%, 2.3 h) | Example 4 (87%, —) | Example 2 (86%, —) |
| | 15 | Comparative Example 3 (10%, 3.2 h) | Comparative Example 7 (9%, 1.5 h) | Example 5 (87%, —) | Example 3 (68%, —) |
| | 0 | Comparative Example 4 (21%, 5.1 h) | Reference Example 3 (75%, —) | Reference Example 2 (62%, —) | Reference Example 1 (50%, —) |

As shown in Table 2 and Table 3, in Examples 1 to 5 and Reference Examples 1 to 3, it was confirmed that short circuit was not generated in all cases, and high coulomb efficiency was obtained. On the other hand, in Comparative Examples 1 to 8, short circuit was generated in all cases. When a comparison was made between Examples 4 and 5 and Reference Example 2, a tendency was recognized that the coulomb efficiency was increased when a confining pressure was applied. The same tendency was also recognized in the case where a comparison was made between Examples 1 to 3 and Reference Example 1. It is contemplated that the reason was because a high confining pressure could suppress the detachment between particles caused by volume changes in the cathode and the anode caused by charging and discharging.

On the other hand, when a comparison was made between Example 4 and Comparative Example 8, it was recognized that if the confining pressure was too high, short circuit tended to occur easily. The same tendency was also recognized when a comparison was made between Reference Example 3 and Comparative Example 7. It is speculated that if the confining pressure was too high, short circuit was generated when precipitated lithium metal was press-fitted into the pores of the electrolyte layer, and was brought into contact with the cathode layer. Therefore, it is suspected that a higher confining pressure is desirable in order to maintain the contact between particles; however, a confining pressure too high causes short circuit in a case in which a soft active material is used. Thus, it is contemplated that there is available an appropriate confining pressure.

Furthermore, when a comparison was made between Comparative Examples 1 to 4, as the confining pressure was lower, the time taken until the occurrence of short circuit was increased, and as a result, the coulomb efficiency was increased. In Comparative Examples 1 to 4, since short circuit occurred in all of the cases, charging was ended after 20 hours. Therefore, the charging capacity was the same in all cases. However, it is contemplated that since a lower confining pressure was accompanied by a longer time taken until the occurrence of short circuit, the actual charging capacity becomes larger when the confining pressure is lower. For that reason, it is contemplated that a smaller confining pressure leads to a larger discharging capacity, and to higher coulomb efficiency. Therefore, it is also suggested from this that a confining pressure too high causes short circuit in a case in which a soft active material is used. From the above, it was suggested that if the confining pressure is too high, short circuit is prone to occur, and if the confining pressure is too low, the coulomb efficiency is decreased.

Figure 6A:
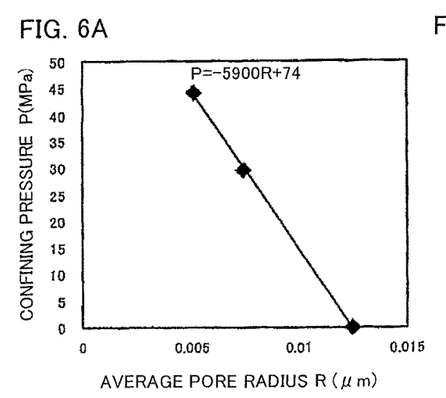
FIGS. 6A to 6C are graphs showing the relationship between the average pore radius and the confining pressure in Examples 1 to 5 and Reference Examples 1 to 3.
Figure 6B:
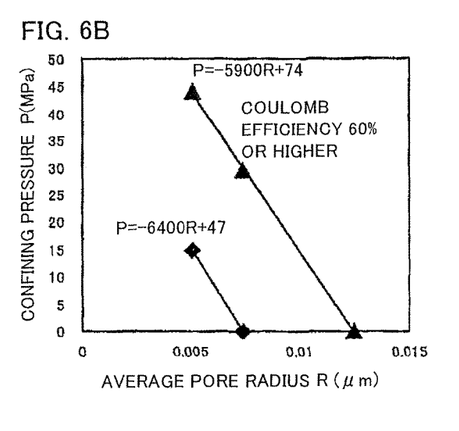
Figure 6C:
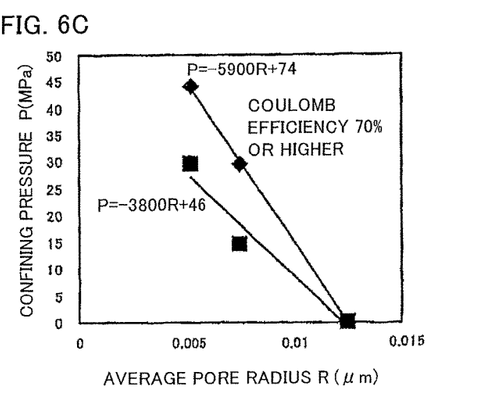

Furthermore, the relationship between the average pore radius and the confining pressure in Examples 1 to 5 and Reference Examples 1 to 3 is shown in FIGS. 6A to 6C. Incidentally, the respective straight lines were determined by linear approximation. As shown in FIG. 6A, the occurrence of short circuit could be suppressed in the case of $P \leq -5900R+74$. That is, the occurrence of short circuit can be suppressed by adjusting the confining pressure P to a particular value or less with respect to the average pore radius R. Furthermore, as shown in FIG. 6B, a coulomb efficiency of 60% or higher was obtained in the case of $-6400R+47 \leq P$, and as shown in FIG. 6C, a coulomb efficiency of 70% or higher was obtained in the case of $-3800R+46 \leq P$.

Figure 7A:
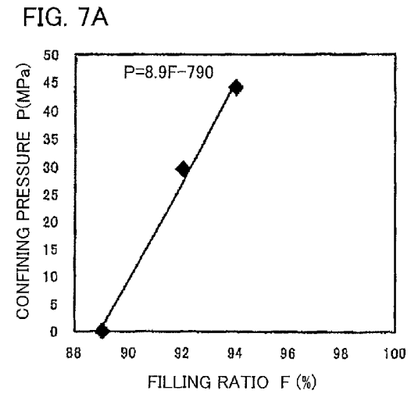
FIGS. 7A to 7C are graphs showing the relationship between the filling ratio and the confining pressure in Examples 1 to 5 and Reference Examples 1 to 3.
Figure 7B:
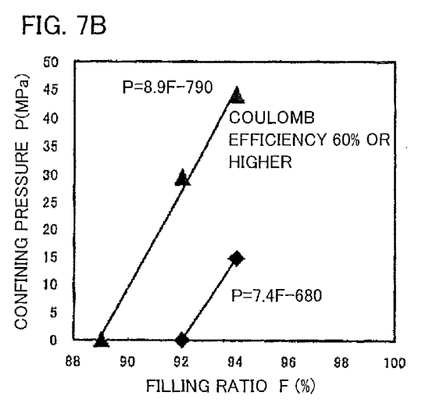
Figure 7C:
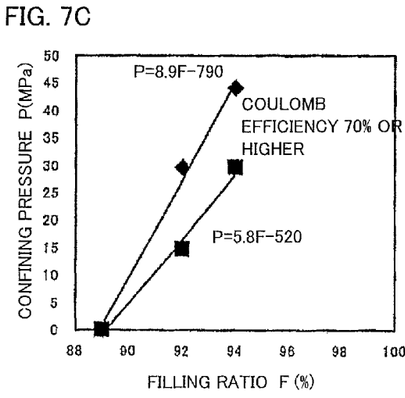

Furthermore, the relationship between the filling ratio and the confining pressure in Examples 1 to 5 and Reference Examples 1 to 3 is shown in FIGS. 7A to 7C. Incidentally, the respective straight lines were determined by linear approximation. As shown in FIG. 7A, the occurrence of short circuit could be suppressed in the case of $P \leq 8.9F-790$. That is, the occurrence of short circuit could be suppressed by adjusting the confining pressure P to a particular value or less with respect to the filling ratio F. Furthermore, as shown in FIG. 7B, a coulomb efficiency of 60% or higher was obtained in the case of $7.4F-680 \leq P$, and as shown in FIG. 7C, a coulomb efficiency of 70% or higher was obtained in the case of $5.8F-520 \leq P$.

REFERENCE SIGNS LIST 1 cathode active material layer
2 anode active material layer
3 solid electrolyte layer
4 cathode current collector
5 anode current collector
6 battery case
10 solid state lithium battery
20 restraining member
30 solid state lithium battery module

What is claimed is:

1. A method of producing a solid state lithium battery module, the solid state lithium battery module comprising: a solid state lithium battery including a cathode active material layer containing a cathode active material, an anode active material layer containing an anode active material, and a solid electrolyte layer formed between the cathode active material layer and the anode active material layer; and a restraining member to apply a confining pressure in a thickness direction to the solid state lithium battery,
    the method of producing the solid state lithium battery module comprising:
        pressing a sulfide glass comprising LiI and an ion conductor containing a Li element, a P element, and a S element, and forming the solid electrolyte layer; and
        restraining the solid state lithium battery including the solid electrolyte layer; using the restraining member such that the relationship: $P \leq -5900R+74$ is satisfied,
    wherein:
        R represents an average pore radius in micrometers (μm) of the solid electrolyte layer formed by the pressing, the average pore radius being obtained by a mercury intrusion method,
        P represents the confining pressure in megapascals (MPa) that is applied to the solid state lithium battery by the restraining member,
        the ion conductor has a $PS_4^{3-}$ structure, and a proportion of the $PS_4^{3-}$ structure with respect to an overall anion structure of the ion conductor is 50 mol % or more, and
        a proportion of LiI in the sulfide glass is in a range of from 20 mol % to 30 mol %.

2. The method of producing a solid state lithium battery module according to claim 1, wherein the solid state lithium battery is restrained such that the relationship: $-6400R+47 \leq P$ is satisfied.

3. A method of producing a solid state lithium battery module, the solid state lithium battery module comprising: a solid state lithium battery including a cathode active material layer containing a cathode active material, an anode active material layer containing an anode active material, and a solid electrolyte layer formed between the cathode active material layer and the anode active material layer; and a restraining member to apply a confining pressure in a thickness direction to the solid state lithium battery,
    the method of producing the solid state lithium battery module comprising:
        pressing a sulfide glass comprising LiI and an ion conductor containing a Li element, a P element, and a S element, and forming the solid electrolyte layer; and
        restraining the solid state lithium battery including the solid electrolyte layer using the restraining member such that the relationship $P \leq 8.9F-790$ is satisfied,
    wherein:
        F represents a filling percentage (%) of the solid electrolyte layer formed by the pressing,
        P represents the confining pressure in megapascals (MPa) that is applied to the solid state lithium battery by the restraining member,
        the ion conductor has a $PS_4^{3-}$ structure, and a proportion of the $PS_4^{3-}$ structure with respect to an overall anion structure of the ion conductor is 50 mol % or more, and
        a proportion of LiI in the sulfide glass is in a range of from 20 mol % to 30 mol %.

4. The method of producing a solid state lithium battery module according to claim 3, wherein the solid state lithium battery is restrained such that the relationship: $7.4F-680 \leq P$ is satisfied.

* * * * *